United States Patent
Taya et al.

(10) Patent No.: US 8,482,798 B2
(45) Date of Patent: Jul. 9, 2013

(54) IMAGE PROCESSING APPARATUS AND IMAGE PROCESSING METHOD TO SUPPRESS COLOR NONUNIFORMITY

(75) Inventors: Kaori Taya, Tokyo (JP); Tomokazu Yanai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 586 days.

(21) Appl. No.: 12/821,520

(22) Filed: Jun. 23, 2010

(65) Prior Publication Data

US 2011/0019214 A1 Jan. 27, 2011

(30) Foreign Application Priority Data

Jul. 23, 2009 (JP) ................................. 2009-172567
Jun. 16, 2010 (JP) ................................. 2010-137681

(51) Int. Cl.
*G06K 15/00* (2006.01)

(52) U.S. Cl.
USPC ........... 358/2.1; 358/1.9; 358/3.03; 358/3.05; 358/3.06; 358/534

(58) Field of Classification Search
USPC ................ 358/1.9, 3.03, 3.05, 3.06, 3.3, 534, 358/2.1
See application file for complete search history.

(56) References Cited

U.S. PATENT DOCUMENTS

| 5,371,612 | A | 12/1994 | Sakamoto |
| 6,256,051 | B1 | 7/2001 | Asada et al. |
| 6,313,883 | B1 * | 11/2001 | Thaler ........................... 348/630 |
| 6,972,871 | B2 | 12/2005 | Tsuda et al. |
| 2006/0279791 | A1 | 12/2006 | Shoji |
| 2008/0186348 | A1 * | 8/2008 | Yanai et al. ..................... 347/15 |
| 2008/0316554 | A1 * | 12/2008 | Yanai et al. .................. 358/534 |
| 2012/0002885 | A1 * | 1/2012 | Murakami et al. ............ 382/218 |

FOREIGN PATENT DOCUMENTS

| JP | 6-130656 | 5/1994 |
| JP | 8-298595 | 11/1996 |
| JP | 2002-112047 | 4/2002 |
| JP | 2006-341521 | 12/2006 |

OTHER PUBLICATIONS

U.S. Appl. No. 12/763,838, filed Apr. 20, 2010. Applicant: Tomokazu Yanai.

* cited by examiner

*Primary Examiner* — Benny Q Tieu
*Assistant Examiner* — Quyen V Ngo
(74) *Attorney, Agent, or Firm* — Fitzpatrick, Cella, Harper & Scinto

(57) ABSTRACT

A plurality of color data respectively undergo quantization processing, and a logical multiplication of the plurality of quantized color data is calculated. A product of the plurality of color data is calculated. A first low frequency component is extracted from the logical multiplication, and a second low frequency component is extracted from the product. The first low frequency component is subtracted from each of the plurality of color data, and the second low frequency component is added to the subtraction results to generate a plurality of corrected color data. The plurality of corrected color data respectively undergo the quantization processing.

6 Claims, 10 Drawing Sheets

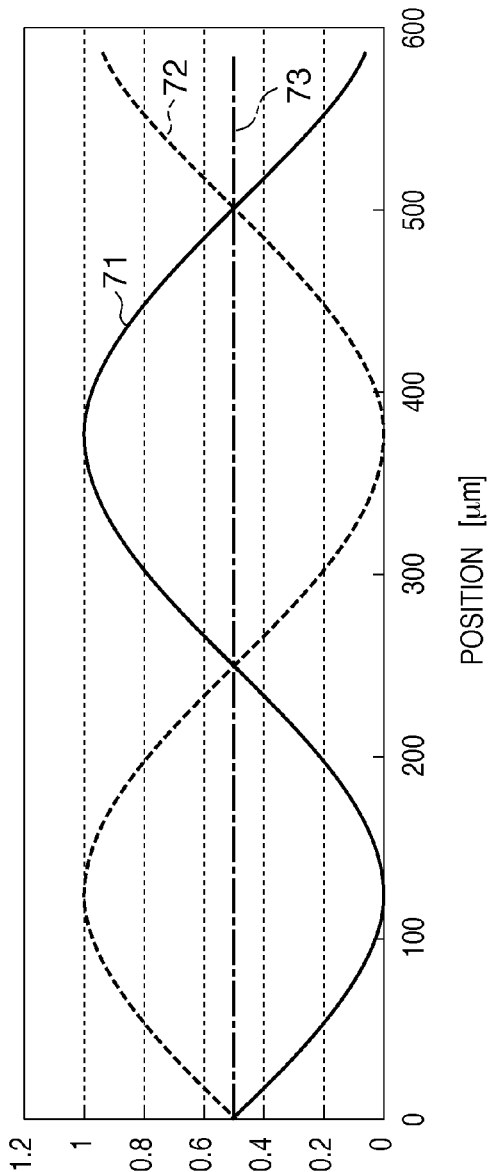
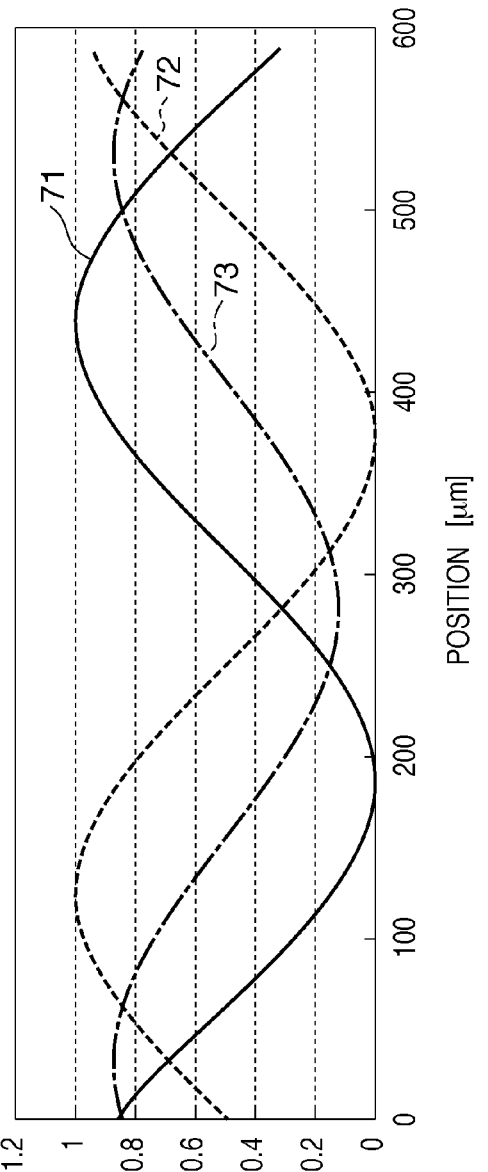

IMAGE PROCESSING APPARATUS AND IMAGE PROCESSING METHOD TO SUPPRESS COLOR NONUNIFORMITY

BACKGROUND OF THE INVENTION

1. Field of the Invention

The present invention relates to an image processing apparatus and image processing method, which generate image data required to form an image using a plurality of color materials.

2. Description of the Related Art

In order to obtain stable tone expression in color printing, the following technique is known. That is, positions where a color material covers paper (color material covering positions will be referred to as dots hereinafter) are arranged in a grid pattern, and respective colors are set to have different grid tilt angles. If the grid patterns of the respective colors are set to have an equal tilt angle, and dots are superposed, the positional relationship between dots becomes constant, and color misregistration directly leads to a color variation, resulting in unstable colors. That is, by changing the tilt angles of the grid patterns for respective colors to obtain different positional relationships between dots of the different colors, a variation of a degree of overlapping of dots due to slight color misregistration is canceled (for example, see Japanese Patent Laid-Open No. 6-130656).

However, there is a demerit due to the different tilt angles of the grid patterns. By tilting the grid patterns, dots have different cycles in the horizontal and vertical directions, and a characteristic pattern (color moiré pattern) having a cycle until the positional relationships among dots of the respective colors return to the same positional relationship is often visually observed.

In the press, a color material is applied to a plate having a physical bumps and dips or a plate to the flat surface of which a hydrophobic or hydrophilic property is given, and an image is transferred to a paper sheet by bringing the plate and sheet into tight contact with each other. On a printed product obtained in the press, a solvent of the color material is vaporized, and only a pigment of the color material is left on the sheet, that is, nearly no materials other than the pigment are left. On the other hand, in electrophotographic printing, a latent image optically rendered on a photosensitive member is developed by charged toner to form a toner image, the toner image is transferred onto a paper sheet, and that toner image is fixed on the sheet by heat and pressure. That is, a resin of the toner serves as an adhesive between the sheet and a pigment included in the toner. As a result, a printed product obtained by the electrophotographic printing has a larger volume of a material attached on the printing surface by the thickness of the resin component than that of a printed product obtained in the press. Furthermore, in case of electrophotographic color printing, resin components are laminated to form multi-layers. The electrophotographic printing which laminates resin components in multi-layers suffers the following problems.

Toner is flattened out by a pressure at the time of fixing. A toner spread becomes more conspicuous with increasing thickness of toner before fixing. That is, the toner spread becomes more conspicuous on a region where a plurality of color toners overlap. As a result, such toner spread influences tone expression based on covering ratios of pigments on a small region. More specifically, since a pigment is also flattened out together with toner, the covering ratio of that pigment increases, resulting in an increase in density of an image.

An increase in covering ratio of the pigment is also caused by scattering of toner at the time of development and fixing. A region where a plurality of color toners overlap (overlapping portion) has a larger toner scattering amount than a region where only one color toner exists (non-overlapping portion). As a result, even when these two regions have the same target density, the density of the overlapping portion becomes higher than that of the non-overlapping portion.

A printing area is often larger or smaller than a rendering area. However, in the electrophotographic color printing, a spreading pattern of the printing area is not uniform, and depends on overlapping of toners. Especially, on a portion where respective color dots overlap, the printing area readily spreads, and has a higher density, resulting in a conspicuous density change due to interference between colors. As a result of such density change, a color moiré pattern appears as a stronger interference pattern. Even in a color combination that does not cause any color moiré pattern on a printed product of the press, the color moiré pattern often becomes obvious on a printed product of the electrophotographic printing.

As a technique for eliminating a color moiré pattern, that using a liquid developing agent is available (for example, Japanese Patent Laid-Open No. 2006-341521, patent reference 2). The liquid developing agent allows to form a thinner toner layer than dry toner, thus providing an effect of suppressing a density change on the overlapping portion.

Also, a technique for eliminating a color moiré pattern by suppressing the amount of applied toners on a color overlapping portion is available (for example, Japanese Patent Laid-Open No. 8-298595, patent reference 3). This technique eliminates the color moiré pattern by decreasing the area of an overlapping portion without printing a Y-color of a portion where, for example, K- and Y-colors overlap.

Furthermore, a technique that obscures the color moiré pattern by expelling the frequency of the color moiré pattern to a high-frequency region is available (for example, Japanese Patent Laid-Open No. 2002-112047, patent reference 4). With this technique, for example, screens which convert the color moiré pattern caused by three colors into high-frequency components are used as C-, M-, and K-colors, and a screen angle of a Y-color is set to be equal to one of the C-, M-, and K-colors to shift a phase, thereby expelling the frequency of the color moiré pattern to the high-frequency region.

However, it is difficult for the technique that eliminates or obscures the color moiré pattern to express a dot image equivalent to a printed product of the press. The invention of patent reference 2 requires not only the special liquid developing agent but also a process for drying the liquid developing agent and that for a vaporized solvent upon drying, resulting in high cost.

With the technique described in patent reference 3, when a pattern of the overlapping portion exists in a high-frequency region, if color misregistration occurs, a reverse effect, that is, so-called a highlight detail loss occurs due to elimination of a color moiré pattern. The invention of patent reference 3 skips correction for eliminating a color moiré pattern when color misregistration is large in consideration of occurrence of color misregistration. In other words, in order to obtain a color moiré elimination effect by the invention of patent reference 3, accurate registration is required. Furthermore, by correction processing that suppresses the area of the overlapping portion, a dot shape changes, and unstable output patterns such as isolated points are likely to be formed.

The invention of patent reference 4 suffers a problem of a large color change when misregistration of the Y-color occurs. The screens of patent reference 4 cannot express a dot image as in the press unlike those used in the press.

SUMMARY OF THE INVENTION

In one aspect, there is provided an image processing apparatus comprising: a logical multiplier, configured to apply quantization processing to each of a plurality of color data, and to calculate a logical multiplication of the plurality of quantized color data; a multiplier, configured to calculate a product of the plurality of color data; a first extractor, configured to extract a first low frequency component from the logical multiplication; a second extractor, configured to extract a second low frequency component from the product; a corrector, configured to subtract the first low frequency component from each of the plurality of color data, and to add the second low frequency component to results of the subtraction so as to generate a plurality of corrected color data; and a quantization section, configured to apply the quantization processing to each of the plurality of corrected color data.

In another aspect, there is provided an image processing method comprising the steps of: applying quantization processing to each of a plurality of color data; calculating a logical multiplication of the plurality of quantized color data; calculating a product of the plurality of color data; extracting a first low frequency component from the logical multiplication; extracting a second low frequency component from the product; subtracting the first low frequency component from each of the plurality of color data; adding the second low frequency component to results of the subtraction to generate a plurality of corrected color data; and applying the quantization processing to each of the plurality of corrected color data.

According to these aspects, a color moiré pattern upon forming an image using a plurality of color materials can be eliminated.

Further features of the present invention will become apparent from the following description of exemplary embodiments with reference to the attached drawings.

BRIEF DESCRIPTION OF THE DRAWINGS

FIGS. 7A and 7B are graphs for explaining correction processing.

DESCRIPTION OF THE EMBODIMENTS

Figure 1:
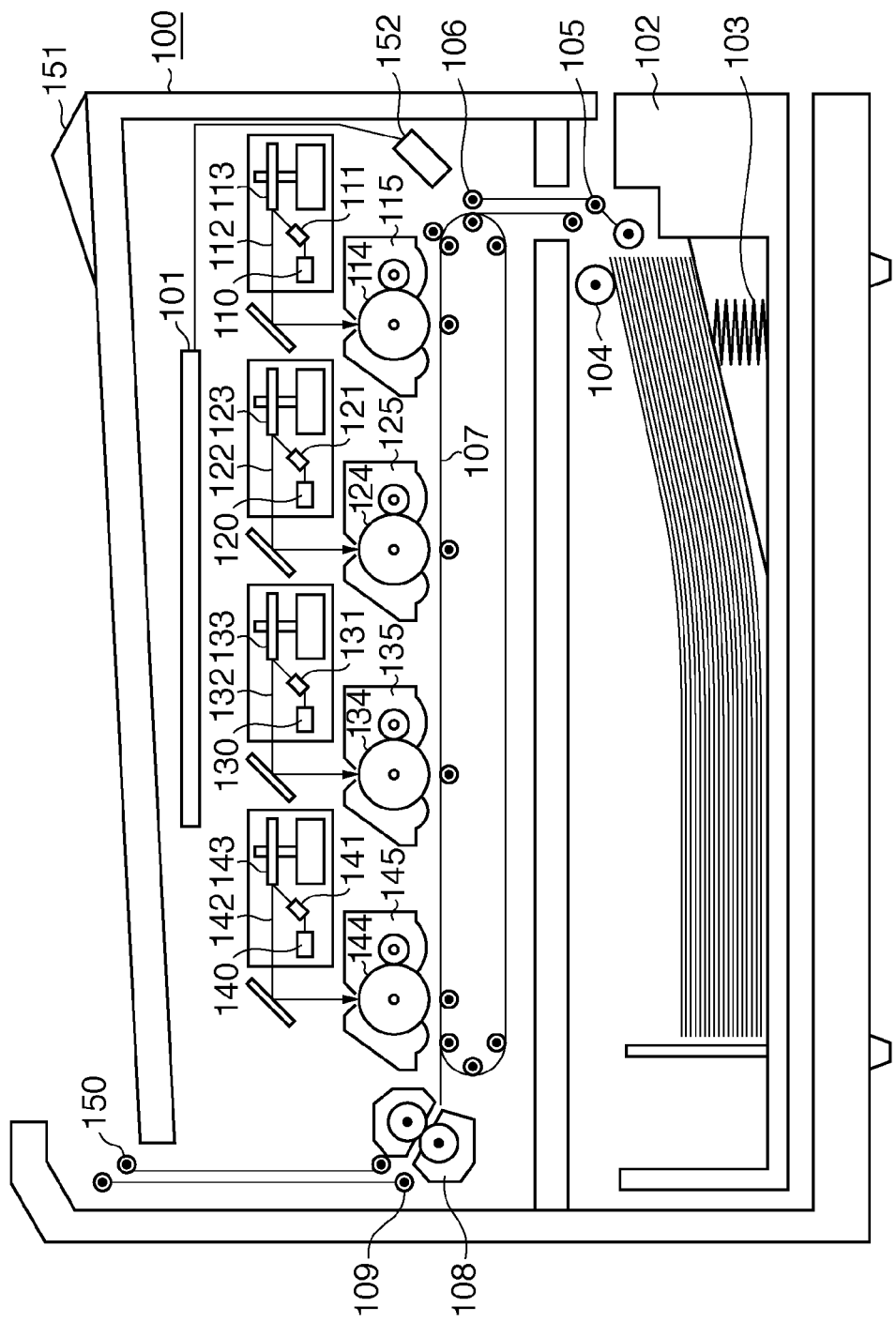
FIG. 1 is a schematic view for explaining the arrangement of an image processing apparatus according to the first embodiment.

An image processing apparatus and image processing method according to embodiments of the present invention will be described in detail hereinafter with reference to the drawings. Note that an image processing apparatus and image processing method of an electrophotography system will be described hereinafter. However, the application range of the present invention is not limited to the electrophotography system.

First Embodiment

[Apparatus Arrangement]

The arrangement of an image processing apparatus according to the first embodiment will be described below using the schematic view shown in FIG. 1. An image processing apparatus 100 is, for example, a laser beam printer which forms an image by an electrophotography system. The image processing apparatus 100 forms an image based on R, G, and B image data input from an external host computer (not shown) on a print sheet.

On an operation panel 151, switches used to operate the image processing apparatus 100, a display used to display the state of the image processing apparatus 100, and the like are arranged. An image processor 101 generates C, M, Y, and K print data based on R, G, and B image data input from a host computer, converts the print data into video signals, and outputs the video signals to C, M, Y, and K laser drivers, respectively.

The image processing apparatus 100 includes image forming units which form and develop latent images for respective colors, that is, cyan C, magenta M, yellow Y, and black K. A laser driver 110 of the C image forming unit drives a semiconductor laser element 111 to output a laser beam 112 according to a C print image. The laser beam 112 is scanned by a rotary polygon mirror 113, and forms a latent image on the surface of an electrostatic drum 114. The latent image is developed by toner including a C color material in a developing unit of a toner cartridge 115.

The M, Y, and K image forming units also have the same arrangement as the C image forming unit. That is, the M image forming unit outputs a laser beam 122 by using a laser driver 120 and a semiconductor laser element 121. The laser beam 122 is scanned by a rotary polygon mirror 123, and forms a latent image on the surface of an electrostatic drum 124. The latent image is developed by toner including an M color material in a developing unit of a toner cartridge 125. The Y image forming unit outputs a laser beam 132 using a laser driver 130 and a semiconductor laser element 131. The laser beam 132 is scanned by a rotary polygon mirror 133, and forms a latent image on the surface of an electrostatic drum 134. The latent image is developed by toner including a Y color material in a developing unit of a toner cartridge 135. The K image forming unit outputs a laser beam 142 using a laser driver 140 and a semiconductor laser element 141. The laser beam 142 is scanned by a rotary polygon mirror 143, and forms a latent image on the surface of an electrostatic drum 144. The latent image is developed by toner including a K color material in a developing unit of a toner cartridge 145.

A print sheet, which is picked up from a paper cassette 102 by a pickup roller 104 in synchronism with formation and development of the latent images in the image forming units, is fed to a conveyor belt 107 by convey rollers 105 and 106. Note that the top surface of print sheets stored in the paper cassette 102 is kept at a predetermined level by a spring 103, and one print sheet is picked up by the pickup roller 104.

On the print sheet which passes through the image forming units of respective colors, that is, C, M, Y, and K by the conveyor belt 107, toner images of respective colors are transferred in the order of C, M, Y, and K. A fixing device 108 fixes the toner images on the print sheet by a heat and pressure. The print sheet on which the toner images are fixed is output onto an exhaust tray of the upper portion of the image processing apparatus 100 by convey rollers 109 and 150.

A color misregistration sensor 152 detects information indicating the amount of color misregistration. The color misregistration sensor 152 inputs the detected information to the image processor 101.

[Image Processor]

Figure 2:
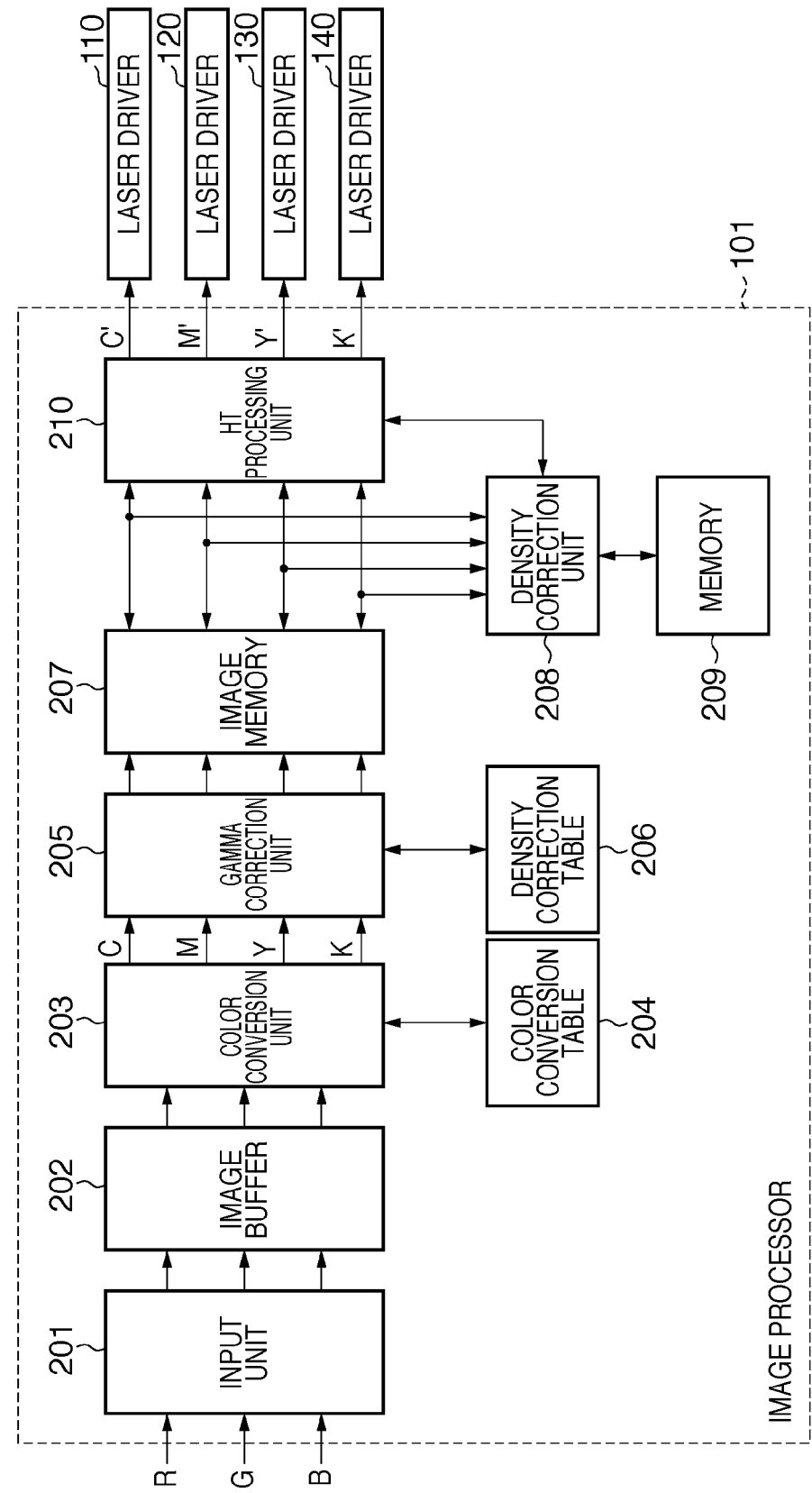
FIG. 2 is a block diagram for explaining the arrangement of an image processor.

The arrangement of the image processor 101 will be described below using the block diagram shown in FIG. 2. An input unit 201 inputs multi-valued R, G, and B data from a host computer. An image buffer 202 buffers the R, G, and B data. A color conversion unit 203 converts the R, G, and B data into C, M, Y, and K data with reference to a color conversion table 204. A gamma correction unit 205 applies tone correction according to the density characteristics of the image forming units to the C, M, Y, and K data with reference to a density correction table 206. An image memory 207 stores the C, M, Y, and K data after the tone correction.

A density correction unit 208 applies density correction required to eliminate a color moiré pattern to image data, which are included in a color set to be corrected of four, C-, M-, Y-, and K-colors, and are stored in the image memory 207, and stores the image data after the density correction in the image memory 207. The color set to be corrected is, for example, that corresponding to a color combination that generates a color moiré pattern in a low frequency region based on settings of halftone processing of a halftone (HT) processing unit 210.

The HT processing unit 210 reads out the multi-valued C, M, Y, and K data, which have undergone the density correction by the density correction unit 208, from the image memory 207, and generates binary C', M', Y', and K' dot data. The C', M', Y', and K' dot data output from the HT processing unit 210 are respectively supplied to the laser drivers 110, 120, 130, and 140.

Density Correction Unit

Figure 3:
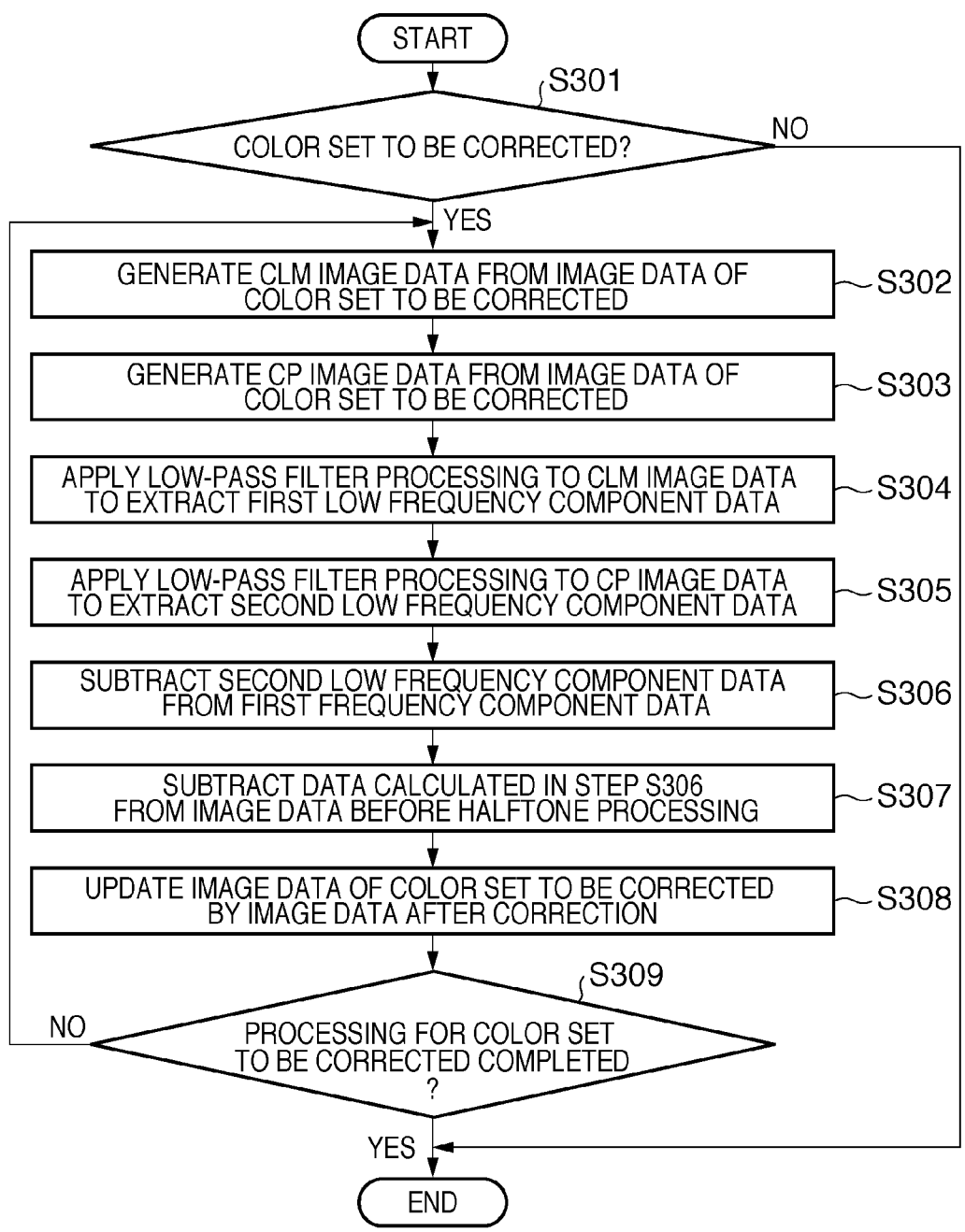
FIG. 3 is a flowchart for explaining the processing of a density correction unit.

The processing of the density correction unit 208 will be described below with reference to the flowchart shown in FIG. 3. The density correction unit 208 determines whether or not a color set to be corrected is included (S301). If no color set to be corrected is included, the density correction unit 208 ends the density correction.

Figure 4:
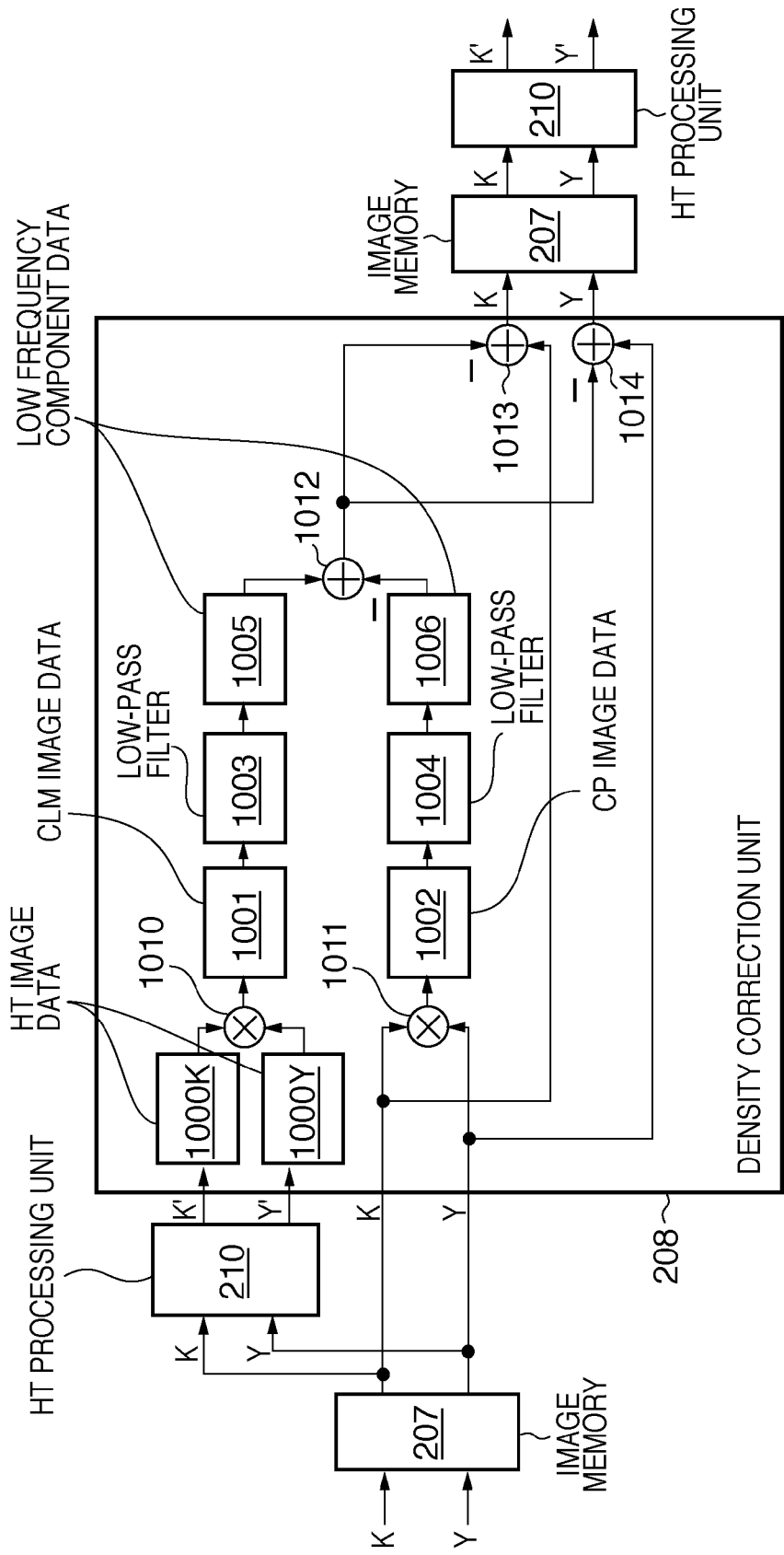
FIG. 4 is a block diagram for explaining the arrangement of the density correction unit.

The arrangement of the density correction unit 208 which executes correction processing for K- and Y-colors will be described below using the block diagram shown in FIG. 4. Note that FIG. 4 shows the flow of image data when the correction processing is applied to the K- and Y-colors. However, the correction processing may be applied to other color sets. In this case, image data of another color set may be input to the density correction unit 208 in place of image data of the K- and Y-colors in FIG. 4. The color set which is to undergo the density correction corresponds to a color combination that generates a color moiré pattern in a low frequency region based on the settings of the halftone processing of the HT processing unit 210. When the combination of the colors is set, "YES" is determined in step S301; when the combination of the colors is not set, "NO" is determined in step S301.

If the color set to be corrected is included, the density correction unit 208 applies halftone processing to image data of the color set stored in the image memory 207 (to be referred to as image data before the halftone processing hereinafter) using the HT processing unit 210. In this embodiment, since the set of K- and Y-colors is set as the color set to be corrected, the density correction unit 208 reads out image data of the K- and Y-colors from the image memory 207, and applies the halftone processing to the image data of the respective colors using the HT processing unit 210, thereby generating binary halftone (HT) image data 1000K of the K-color and binary HT image data 1000Y of the Y-color. In this embodiment, assume that a pixel value of a pixel which forms a dot is '1' (black pixel), and that of a pixel which does not form any dot is '0' (white pixel).

A logical multiplication circuit 1010 calculates a logical multiplication of the HT image data 1000K and 1000Y to generate color logical multiplication (CLM) image data 1001 (S302). Therefore, the CLM image data 1001 assumes '1' when a combination of the HT image data 1000K and 1000Y corresponds to that of a black pixel and black pixel, and '0' for other cases. Furthermore, in step S302, FFh is assigned to a pixel which indicates a logical multiplication result='1', and 0 is assigned to a pixel which indicates '0', thereby generating 8-bit CLM image data 1001. That is, in order to extract overlapping portions where dots overlap based on the HT image data of the two selected colors, the CLM image data 1001 is generated. Note that the generated CLM image data 1001 is stored in a memory 209.

A multiplication circuit 1011 calculates a product of the image data of the K- and Y-colors before the halftone processing to generate color product (CP) image data 1002 (S303). The image data before the halftone processing, CLM image data 1001, and CP image data 1002 have to have an equal bit depth. In this embodiment, since each image data before the halftone processing is 8-bit data, the CLM image data 1001 is generated as 8-bit data, as described above. The multiplication circuit 1011 outputs 16-bit CP image data 1002. Hence, the bit depth of the CP image data 1002 is converted from 16 bits to 8 bits. The generated CP image data 1002 is stored in the memory 209.

A low-pass filter 1003 extracts low frequency components of the CLM image data 1001 by low-pass filter processing to generate first low frequency component data 1005 (S304). The first low frequency component data 1005 represents a low frequency image caused by color nonuniformity of a low frequency region, which becomes obvious due to spreads of dot overlapping portions. A low-pass filter 1004 extracts low frequency components of the CP image data 1002 by low-pass filter processing to generate second low frequency component data 1006 (S305). The extracted first and second low frequency component data are stored in the memory 209.

A calculation unit 1012 subtracts the second low frequency component data 1006 from the first low frequency component data 1005 (S306). Calculation units 1013 and 1014 subtract the data calculated in step S306 from the image data of the K- and Y-colors before the halftone processing (S307).

In this embodiment, the aforementioned processes are executed in steps S306 and S307. Alternatively, the first low frequency component data 1005 may be subtracted from and the second low frequency component data 1006 may be added to the image data of the K- and Y-colors before the halftone processing. The reason why the first low frequency component data 1005 is subtracted from the image data before the halftone processing is to suppress color nonuniformity of the low frequency region by decreasing an image density of a region corresponding to dot overlapping portions. However, since the density of the entire image is decreased by this subtraction, the second low frequency component data 1006 is added to prevent an image density drop.

In the aforementioned example, under the condition that a dot is expanded on a dot overlapping portion compared to a dot non-overlapping portion, the image density of the dot overlapping portion is lowered to suppress dot expansion, thereby suppressing the amount of applied color materials.

Next, the density correction unit 208 updates the image data of the corresponding colors in the image memory 207 by the image data after correction (S308). The density correction unit 208 then determines whether or not all processes for the color set to be corrected are complete (S309). If NO in step S309, the process returns to step S302 to repeat steps S302 to S308 until the processes for the color set to be corrected are complete.

Figure 5A:
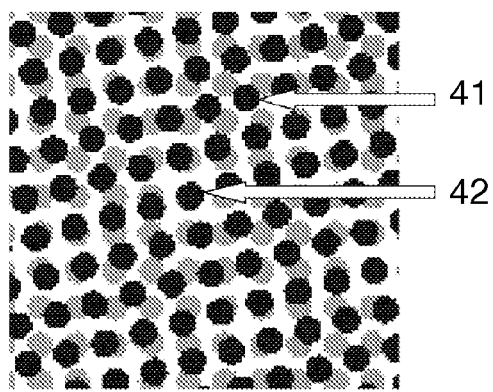
FIGS. 5A to 5D are views for explaining the density correction effect of the density correction unit.

The density correction effect of the density correction unit 208 will be described below with reference to FIGS. 5A to 5D. FIG. 5A shows a dot image of a mixed color region of Y and K, which has undergone the HT processing using AM screens of Y=90° and K=15° without applying any density correction by the density correction unit 208. Note that FIGS. 5A and 5C express Y as 50% gray dots for the sake of easy recognition, but an actual Y gray value is considerably lower. When this dot image is output by the image processing apparatus 100, degrees of dot spreads are different on a non-overlapping portion 41 where a dot overlapping area is small and an overlapping portion 42 where a dot overlapping area is large, thus causing different covering ratios (dot area ratios) of color materials.

Figure 5B:
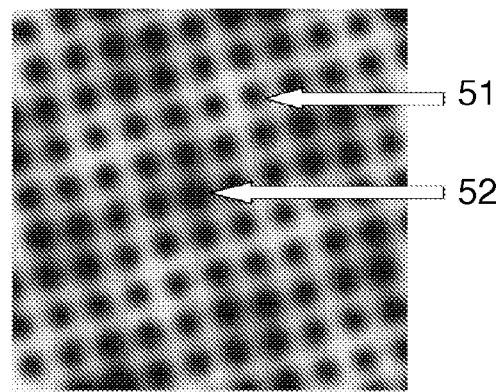

FIG. 5B shows the print result of the dot image shown in FIG. 5A by the image processing apparatus 100. Note that in FIGS. 5B and 5D, an actual output result is converted into a gray image, and Y dots are not clearly observed unlike in FIG. 5A. A dot expansion of a non-overlapping portion 51 is small, but that of an overlapping portion 52 is large, and a color moiré pattern becomes obvious due to different dot area ratios of the non-overlapping portion 51 and the overlapping portion 52.

Figure 5C:
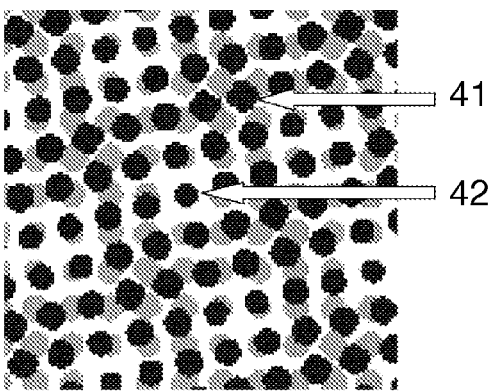
Figure 5D:
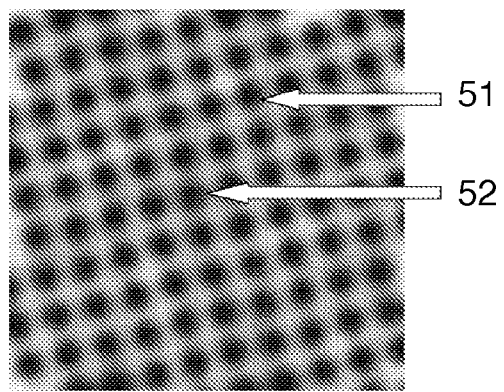

FIG. 5C shows a dot image of a mixed color region of Y and K, which has undergone the density correction by the density correction unit 208 and the same HT processing as in FIG. 5A. As shown in FIG. 5C, the dot area of the non-overlapping portion 41 is nearly the same as that in FIG. 5A, but that of the overlapping portion 42 is smaller than that in FIG. 5A. FIG. 5D shows the output result of the dot image shown in FIG. 5C by the image processing apparatus 100. Both dot expansions of the non-overlapping portion 51 and overlapping portion 52 are small, and a difference between the dot area ratios of the non-overlapping portion 51 and overlapping portion 52 is reduced, thus suppressing the color moiré pattern.

As described above, a color set corresponding to a color combination that generates a color moiré pattern in the low frequency region as a result of the halftone processing is selected, and the aforementioned density correction is applied to image data of these colors. As a result, the amount of applied color materials of the overlapping portion whose repetition corresponds to the low frequency region is corrected, thus eliminating the color moiré pattern in the low frequency region. In other words, dot data which allows to stably obtain a high-quality printed product can be output by suppressing an increase in density of the overlapping portion where the color moiré pattern in the low frequency region becomes obvious.

Second Embodiment

The same reference numerals in the second embodiment denote the same components as in the first embodiment, and a detailed description thereof will not be repeated.

The first embodiment has explained the image processing which suppresses a dot expansion (increase in density) on a dot overlapping portion and prevents a color moiré pattern in the low frequency region from becoming obvious. The second embodiment further considers color misregistration.

Figure 6:
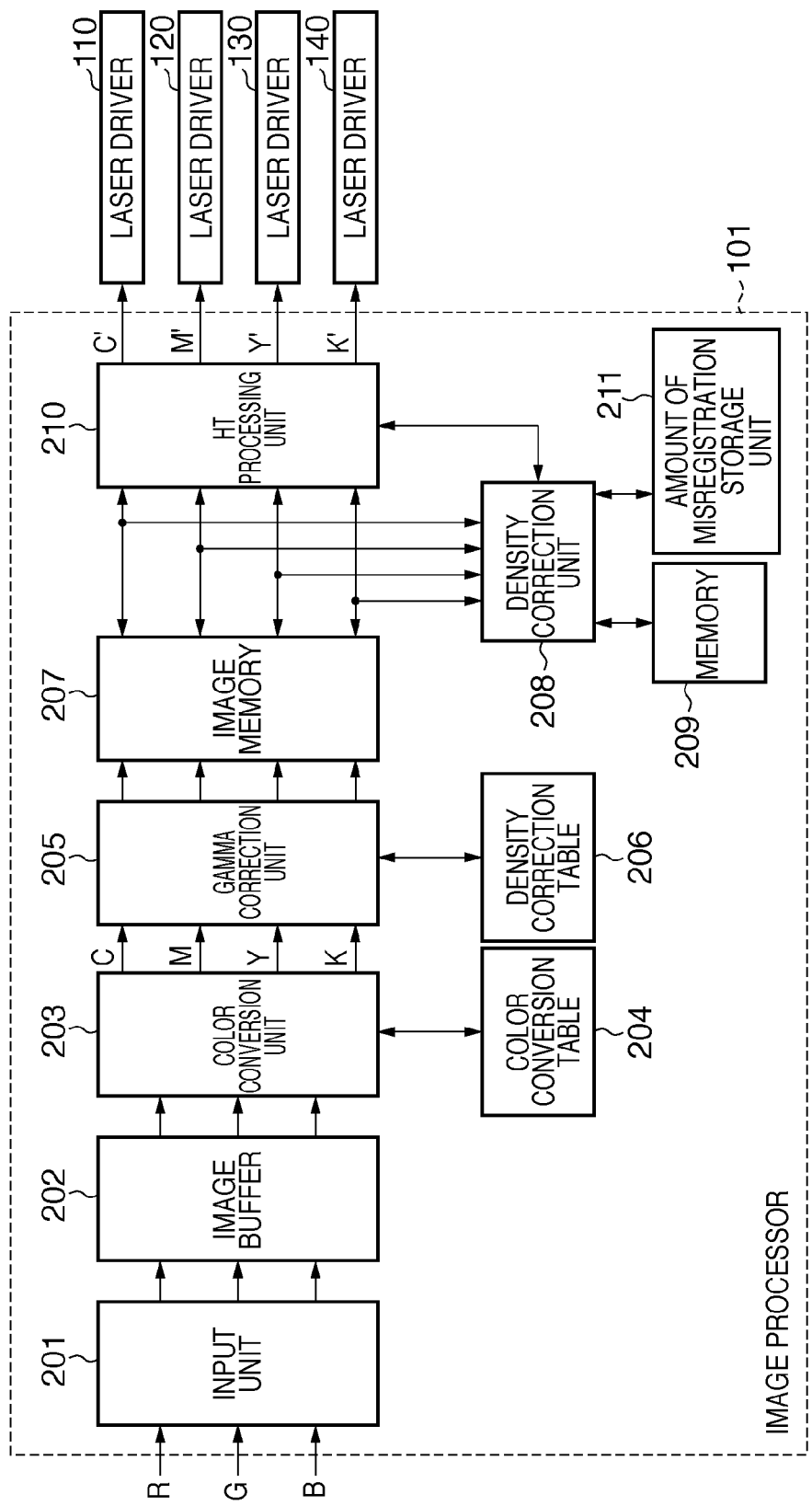
FIG. 6 is a block diagram for explaining the arrangement of an image processor according to the second embodiment.

The arrangement of an image processor 101 according to the second embodiment will be described below using the block diagram shown in FIG. 6. The arrangement shown in FIG. 6 includes an amount of misregistration storage unit 211 unlike in the first embodiment. The amount of misregistration storage unit 211 stores amounts of misregistration between C-, M-, Y-, and K-colors in an image processing apparatus 100. Note that the amount of misregistration storage unit 211 stores, for example, variation amounts of color misregistration in tables for respective colors as the amounts of misregistration. Alternatively, the amount of misregistration storage unit 211 may store, as the amounts of misregistration, variation amounts of color misregistration every time a plurality of sheets are output or those during output of one sheet.

A density correction unit 208 selects a color set for which a density correction effect can be expected even when color misregistration has occurred from those to be corrected based on the amounts of misregistration stored in the amount of misregistration storage unit 211. When the amounts of misregistration stored in the amount of misregistration storage unit 211 are the variation amounts of color misregistration every time a plurality of sheets are output, outputs that can obtain the density correction effect, and those that cannot obtain the effect can be prevented from being mixed in the outputs of the plurality of sheets. When the amounts of misregistration are the variation amounts of color misregistration during output of one sheet, a region where the density correction effect can be obtained and that where no effect is obtained can be prevented from being mixed during output of one sheet.

The density correction unit 208 selects a color set with which a cycle of a color moiré pattern calculated based on settings of halftone processing of an HT processing unit 210 becomes six times or more of that of the amount of misregistration between the colors, as a color set for which the density correction effect can be expected. This reason will be described below.

Letting f be the frequency of a color moiré pattern in a low frequency region, correction processing of this embodiment can be considered as that for correcting an image by adding correction data having a phase opposite to that of the color moiré pattern at the frequency f. The correction processing will be described below with reference to FIGS. 7A and 7B. Assume that a value to be output is uniformly 0.5 in FIGS. 7A and 7B. Also, assume that the cycle of the color moiré pattern is 500 μm.

FIG. 7A shows a color moiré pattern 71, correction data 72, output data 73 after correction when no color misregistration occurs. A variation of the color moiré pattern 71 is canceled by the correction data 72, and the output data 73 after correction assumes a constant value "0.5". FIG. 7B shows a color moiré pattern 71, correction data 72, and output data 73 after correction when color misregistration has occurred, and an amount of color misregistration is 62.5 μm. In FIG. 7B, the color moiré pattern 71 cannot be completely corrected unlike in FIG. 7A. However, since the amount of color misregistration is as relatively small as 62.5 μm compared to the cycle=500 μm of the color moiré pattern 71, a variation of the output data 73 is suppressed although slightly compared to the color moiré pattern 71.

Figure 8:
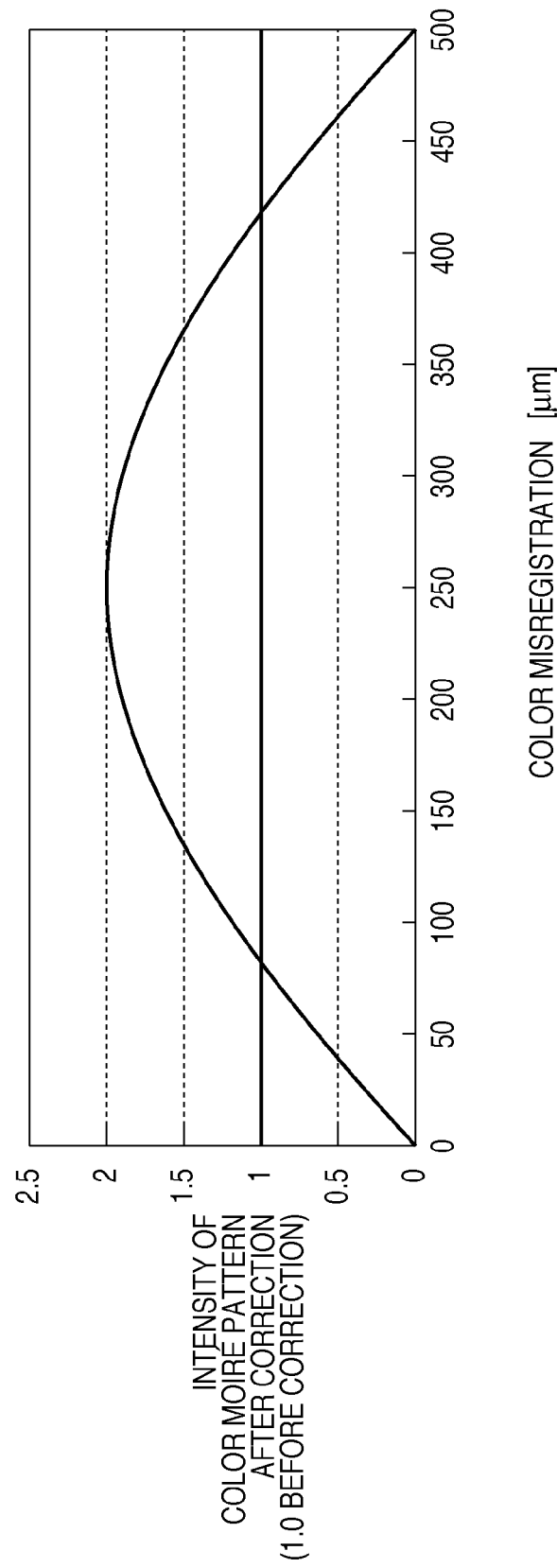
FIG. 8 is a graph representing the relationship between the amount of color misregistration and the correction effect.

FIG. 8 shows the relationship between the amount of color misregistration and correction effect. In general, when the cycle of the amount of color misregistration is ⅙ or less of that of the color moiré pattern 71, a variation of the output data 73 can be eliminated by correction. FIG. 8 shows a case when the cycle of the color moiré pattern 71 is 500 μm, and represents a variation (amplitude) of the output data 73 after correction under the assumption that a variation (amplitude) of the color moiré pattern 71 is 1. As shown in FIG. 8, when the amount of color misregistration falls within a range of about ±83 μm, an effect of eliminating the variation of the output data (color moiré pattern) can be provided. That is, the density correction unit 208 executes correction processing within a color misregistration range in which the color moiré elimination effect can be obtained, with reference to the amount of misregistration storage unit 211.

Figure 9:
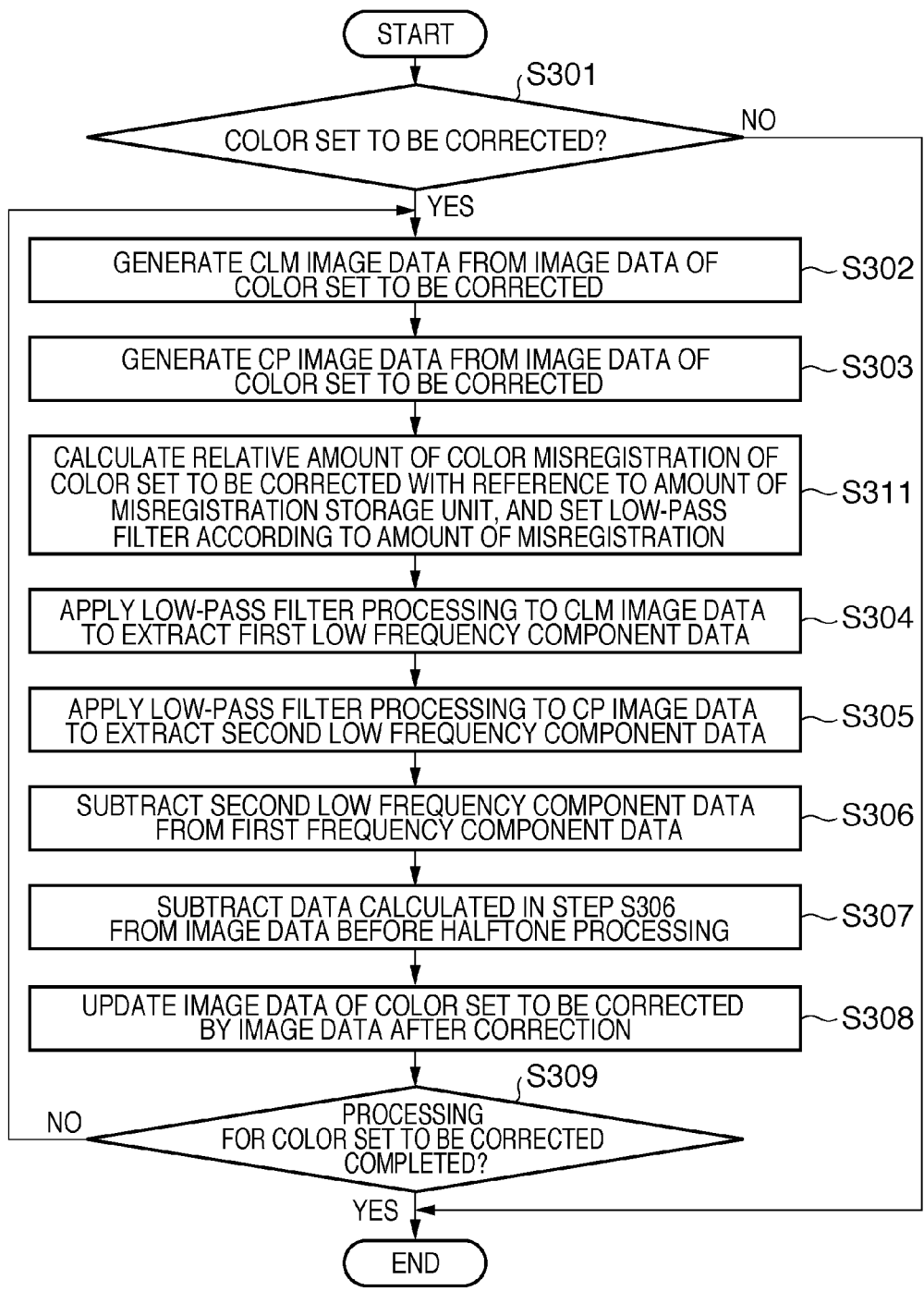
FIG. 9 is a flowchart for explaining the processing of a density correction unit according to the second embodiment.

The processing of the density correction unit 208 of the second embodiment will be described below with reference to the flowchart shown in FIG. 9. Unlike in the processing of the first embodiment, the density correction unit 208 calculates a relative amount of misregistration of the color set to be corrected with reference to the amount of misregistration storage unit 211, and sets low-pass filters used in steps S304 and S305 according to that value in step S311. For example, the density correction unit 208 sets a cycle of a cutoff frequency of each low-pass filter to be six times or more of the relative amount of color misregistration.

In this manner, even when color misregistration has occurred, the color moiré pattern can be eliminated.

Third Embodiment

The same reference numerals in the third embodiment denote the same components as in the first and second embodiments, and a detailed description thereof will not be repeated.

The second embodiment has explained the processing for correcting a color moiré pattern in consideration of color misregistration. The third embodiment will explain an example in which color misregistration is dynamically acquired.

An image processor 101 receives information indicating an amount of color misregistration from a color misregistration sensor 152 shown in FIG. 1, and calculates an amount of color misregistration from the received information. Then, the image processor 101 stores the calculated amount of color misregistration (dynamically detected amount of misregistration) in an amount of misregistration storage unit 211 shown in FIG. 6.

A density correction unit 208 selects a color set for which a density correction effect can be expected even when color misregistration occurs of those to be corrected based on the amounts of misregistration stored in the amount of misregistration storage unit 211, as described in the second embodiment. Furthermore, the density correction unit 208 calculates an average amount of misregistration during output of one sheet (to be referred to as a page hereinafter) from the dynamically detected amount of misregistration, and executes correction processing based on the average amount of misregistration.

Figure 10:
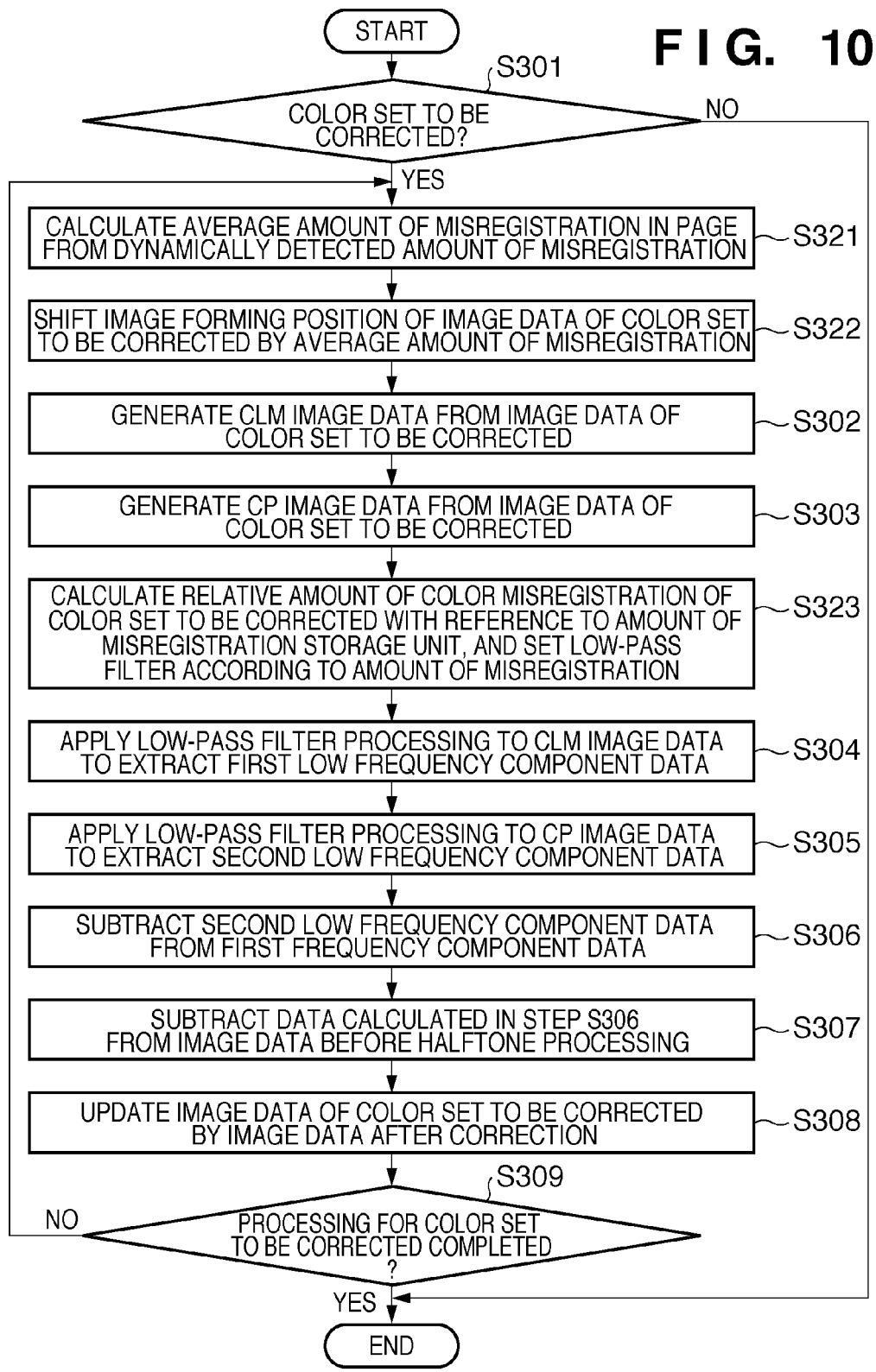
FIG. 10 is a flowchart for explaining the processing of a density correction unit according to the third embodiment.

The processing of the density correction unit 208 according to the third embodiment will be described below with reference to the flowchart shown in FIG. 10. Only differences from the processing of the first embodiment will be described in detail below.

The density correction unit 208 calculates an average amount of misregistration in the page from the dynamically detected amount of misregistration (S321), and shifts image forming positions of image data of the color set to be corrected, stored in an image memory 207 by the average amount of misregistration (S322). After that, the density correction unit 208 generates CLM image data (S302) and CP image data (S303). Note that interpolation processing is desirably executed upon shifting image data.

Next, the density correction unit 208 calculates a relative amount of color misregistration of the color set to be corrected based on the amounts of misregistration stored in the amount of misregistration storage unit 211, and sets low-pass filters used in steps S304 and S305 according to that value (S323) as in the processing of the second embodiment.

In this manner, a color moiré pattern can be eliminated more effectively based on the dynamically detected amount of color misregistration.

Modification of Embodiments

The first to third embodiments have exemplified the four colors C, M, Y, and K. However, even when colors or the number of colors is different, the same effects can be obtained. The electrophotographic printing has been described. Also, the same effects can be expected in a printing system in which degrees of dot spread are different on an overlapping portion and non-overlapping portion of dots. For example, when the aforementioned density correction is applied to an ink-jet printer, the same effects can be expected.

The first to third embodiments have exemplified the case in which the HT processing unit 210 executes binarization processing. Alternatively, the HT processing unit 210 may execute quantization processing that converts to other numbers of tones such as a ternary value and quaternary value.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-172567, filed Jul. 23, 2009 and 2010-137681, filed Jun. 16, 2010, which are hereby incorporated by reference herein in their entirety.

What is claimed is:

1. An image processing apparatus comprising:
    a logical multiplier, configured to apply quantization processing to each of a plurality of color data, and to calculate a logical multiplication of the plurality of quantized color data;
    a multiplier, configured to calculate a product of the plurality of color data;
    a first extractor, configured to extract a first low frequency component from the logical multiplication;
    a second extractor, configured to extract a second low frequency component from the product;
    a corrector, configured to subtract the first low frequency component from each of the plurality of color data, and to add the second low frequency component to the results of the subtraction so as to generate a plurality of corrected color data; and
    a quantization section, configured to apply the quantization processing to each of the plurality of corrected color data.

2. The apparatus according to claim 1, wherein said first and second extractors extract the low frequency components using low-pass filters according to amounts of color misregistration corresponding to the plurality of color data.

3. The apparatus according to claim 1, wherein processing using said corrector is executed when a cycle of an amount of color misregistration corresponding to the plurality of color data is not more than ⅙ of a cycle of a moiré pattern generated between the plurality of colors.

4. The apparatus according to claim 1, further comprising:
an acquisition section, configured to acquire amounts of misregistration of a plurality of colors; and
a position shifter, configured to apply processing for shifting image forming positions to the plurality of color data based on the acquired amounts of misregistration.

5. An image processing method comprising:
using a processor to perform the steps of:
applying quantization processing to each of a plurality of color data;
calculating a logical multiplication of the plurality of quantized color data;
calculating a product of the plurality of color data;
extracting a first low frequency component from the logical multiplication;
extracting a second low frequency component from the product;
subtracting the first low frequency component from each of the plurality of color data;
adding the second low frequency component to the results of the subtraction to generate a plurality of corrected color data; and
applying the quantization processing to each of the plurality of corrected color data.

6. A non-transitory computer-readable storage medium storing a computer-executable program for causing a computer to perform an image processing method, the method comprising the steps of:
applying quantization processing to each of a plurality of color data;
calculating a logical multiplication of the plurality of quantized color data;
calculating a product of the plurality of color data;
extracting a first low frequency component from the logical multiplication;
extracting a second low frequency component from the product;
subtracting the first low frequency component from each of the plurality of color data;
adding the second low frequency component to the results of the subtraction to generate a plurality of corrected color data; and
applying the quantization processing to each of the plurality of corrected color data.

* * * * *